Figure 1:
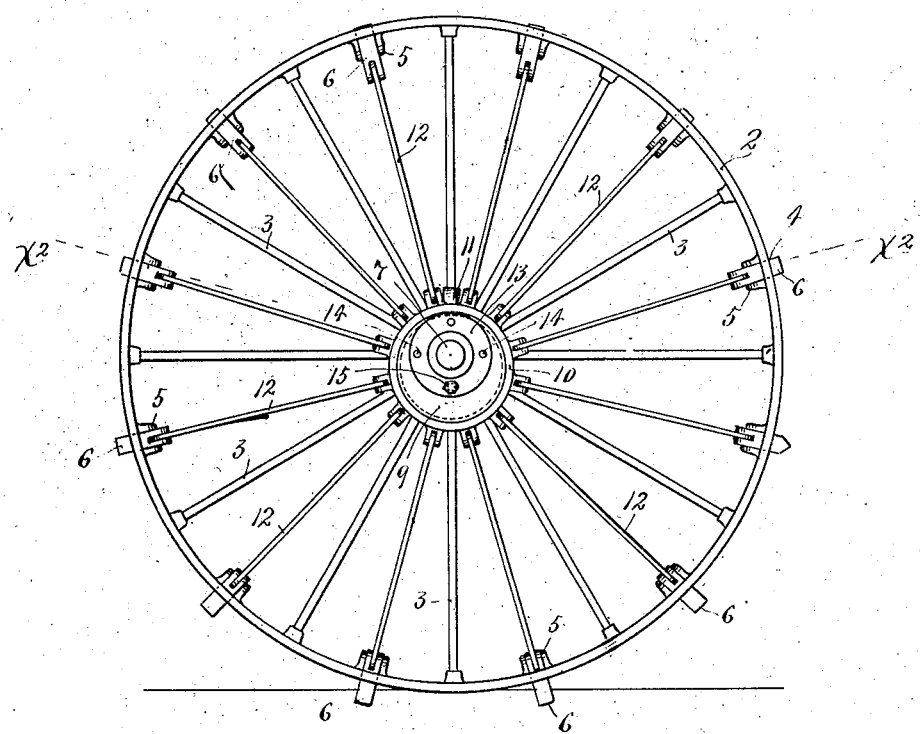

No. 815,633. PATENTED MAR. 20, 1906.
E. F. PIPER.
TRACTION WHEEL.
APPLICATION FILED APR. 29, 1905.

2 SHEETS—SHEET 1.

Witnesses
A. H. Opsahl.
E. W. Jeppesen.

Inventor
Edmund F. Piper,
By his Attorneys.
Williamson Merchant

No. 815,633. PATENTED MAR. 20, 1906.
E. F. PIPER.
TRACTION WHEEL.
APPLICATION FILED APR. 29, 1905.

2 SHEETS—SHEET 2.

Witnesses.
A. H. Opsahl.
E. W. Jeppesen.

Inventor.
Edmund F. Piper
By his Attorneys.
Williamson & Merchant

UNITED STATES PATENT OFFICE.

EDMUND F. PIPER, OF FARGO, NORTH DAKOTA.

TRACTION-WHEEL.

No. 815,633.  Specification of Letters Patent.  Patented March 20, 1906.

Application filed April 29, 1905. Serial No. 258,007.

*To all whom it may concern:*

Be it known that I, EDMUND F. PIPER, a citizen of the United States, residing at Fargo, in the county of Cass and State of North Dakota, have invented certain new and useful Improvements in Traction-Wheels; and I do hereby declare the following to be a full, clear, and exact description of the invention, such as will enable others skilled in the art to which it appertains to make and use the same.

My invention relates to traction-wheels, and has for its object to provide self-clearing mud-cleats therefor.

To the above ends the invention consists of the novel devices and combinations of devices hereinafter described, and defined in the claim.

Hitherto the mud cleats or lugs of traction-wheels such as used on traction-engines and as the driving-wheels of harvesters have been rigidly secured to the periphery of the wheel, so that in clay or sticky soil the dirt adhering thereto often renders them practically useless.

My invention provides the traction-wheel with movable self-cleaning mud-cleats, which work through the rim of the wheel. Movements are imparted to these mud-cleats by cam or eccentric actuated connections, the preferred arrangement being illustrated in the drawings.

In the drawings like characters indicate like parts throughout the several views.

Figure 2:
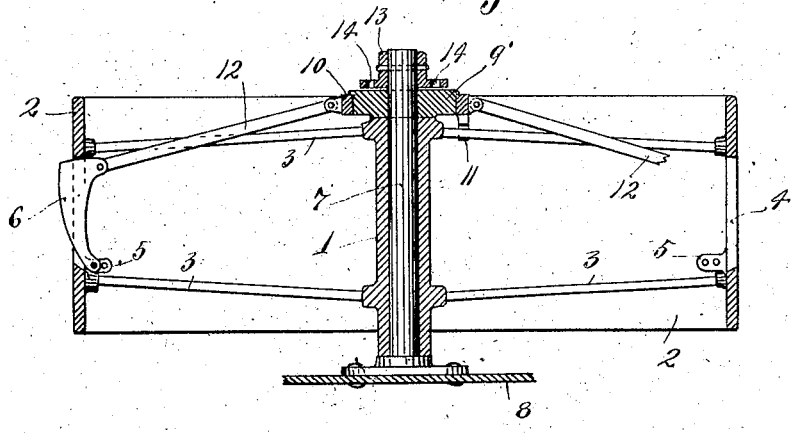
Figure 3:
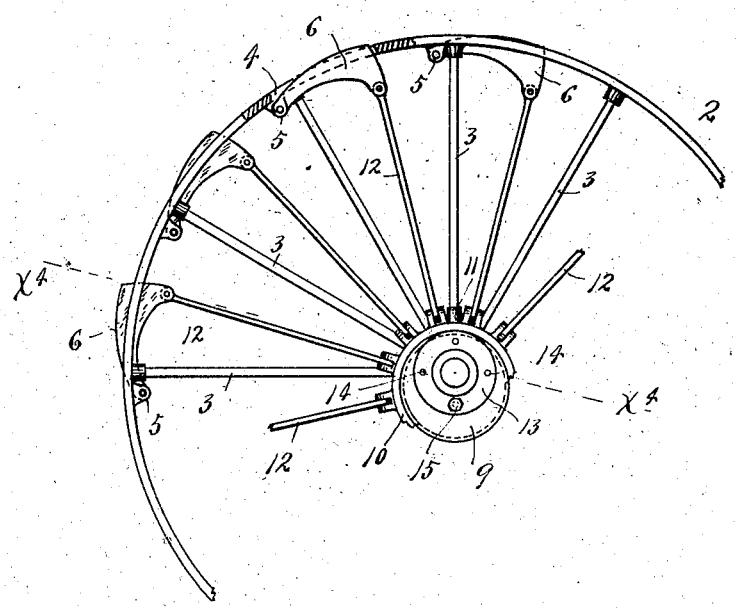
Figure 4:
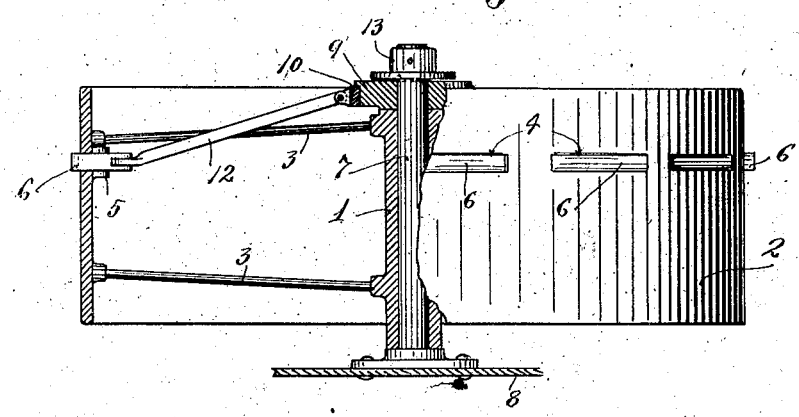

Figure 1 is a view in side elevation, showing a traction-wheel designed in accordance with my invention. Fig. 2 is a horizontal section taken approximately on the line $x^2 \, x^2$ of Fig. 1. Fig. 3 is a view in side elevation with parts broken away, illustrating a modified form of the invention; and Fig. 4 is a view, partly in plan and partly in section, on the line $x^4 \, x^4$ of Fig. 3.

Referring first to the construction illustrated in Figs. 1 and 2, the numeral 1 indicates the sleeve-like hub, the numeral 2 the wide-faced rim, and the numeral 3 the spokes of a traction-wheel, such as used on traction-engines. In its rim the wheel is provided between the spokes with transversely-extended slots 4, and near one end of each slot said rim is provided with lugs 5. To each lug 5 is pivoted at one end a plate-like mud-flange 6, that is adapted to work freely, but with close engagement, through the adjacent slot 4.

A fixed trunnion or shaft 7 projects through the hub portion of the traction-wheel and, as shown, is rigidly secured at one end to a portion 8 of the engine-frame. Loosely mounted on the trunnion 7, outside of the hub 1, is an eccentric 9, upon which is mounted an eccentric-strap 10, which is provided with one or more laterally-projecting lugs 11, that engage an adjacent spoke 3, and thereby causes said eccentric-strap to rotate with the wheel, while permitting the same a slight vibratory movement transverse to the axis thereof. Links 12 pivotally connect the free ends of the movable mud-flanges 6 with the said eccentric-strap 10.

Rigidly secured to the extreme outer end of the trunnion 7 is a flanged sleeve 13, the flange of which has a plurality of bolt-holes 14. By means of a machine-bolt 15, which may be passed through either of the holes 14, the eccentric 9 may be anchored to the flanged non-rotary sleeve 13 in any one of several positions.

When the eccentric 9 is anchored in its lowermost position, as shown in Fig. 1, it will act upon the eccentric-strap 10 and through the links 12 to cause the mud-flanges 6 to project downward through the rim of the wheel to the greatest extent at the bottom or ground-engaging portion of the rim; but when said eccentric is turned into its uppermost position, or at one hundred and eighty degrees from the position shown in Fig. 1, it will cause the said mud-flanges to project through the rim of the wheel only at the uppermost position thereof and will draw the same into the rim of the wheel at the lowermost or ground-engaging portion of the rim. The former adjustment is of course desirable when the wheel is running over plowed or soft ground, while the latter adjustment is desirable when the wheel is running over hard smooth ground.

As is evident, under the constantly-vibrating movements imparted to the mud-flanges under the rotation of the wheel the wheel-rim acts as a stripper-plate to scrape mud from said mud-flanges, thereby keeping the said flanges clean and preventing accumulation of mud on the outer face of the wheel-rim.

The construction illustrated in Figs. 3 and 4 is the same as that already described, except that the slots 4 in the wheel-rim are extended circumferentially thereof and the oscillating mud-flanges 6 are arranged in the plane of the wheel—that is, circumferentially thereof. This latter-described construction is especially adapted for use on wheels that are subjected to lateral or sidewise crowding strains.

From what has been said it will be understood that the device described is capable of many modifications within the scope of my invention as herein set forth and claimed. The movable mud-flanges, while preferably pivoted, may be otherwise mounted for movements through the wheel-rim, and the eccentrically-actuated connection for operating the said mud-flanges might involve an irregular cam instead of the cylindrical eccentric and eccentric-strap.

What I claim, and desire to secure by Letters Patent of the United States, is as follows:

A traction-wheel having a plurality of pivoted mud-flanges arranged to work through the rim thereof, an eccentric at the axis of said wheel, means for anchoring said eccentric in different positions circumferentially with respect to the wheel, an eccentric-strap on said eccentric having a lug engageable with one of the wheel-spokes, whereby it is caused to rotate with the wheel, but is free to vibrate transversely with respect to the axis thereof, and links connecting said eccentric-strap to the free ends of said mud-flanges, substantially as described.

In testimony whereof I affix my signature in presence of two witnesses.

EDMUND F. PIPER.

Witnesses:
  ALICE R. BLAIR,
  V. R. LOVELL.